(12) United States Patent
Collins

(10) Patent No.: US 8,410,937 B2
(45) Date of Patent: Apr. 2, 2013

(54) TWO-PART SECURITY TAG

(75) Inventor: Timothy J. Collins, Homer Glen, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 591 days.

(21) Appl. No.: 12/647,787

(22) Filed: Dec. 28, 2009

(65) Prior Publication Data

US 2011/0156905 A1    Jun. 30, 2011

(51) Int. Cl.
*G08B 13/14* (2006.01)
(52) U.S. Cl. ............... 340/572.4; 340/572.1; 340/572.7
(58) Field of Classification Search ............. 340/572.1, 340/572.4, 572.7, 572.8, 10.1, 10.2, 10.4, 340/10.5, 10.34; 235/380, 385, 492
See application file for complete search history.

(56) References Cited

U.S. PATENT DOCUMENTS

| | | | | |
|---|---|---|---|---|
| 7,432,817 B2* | 10/2008 | Phipps et al. | ............ | 340/572.7 |
| 7,642,916 B2* | 1/2010 | Phipps et al. | ............ | 340/572.7 |
| 7,800,497 B2* | 9/2010 | Marusak et al. | ......... | 340/545.1 |
| 7,973,662 B2* | 7/2011 | Phipps et al. | ............ | 340/572.1 |
| 8,063,779 B2* | 11/2011 | Coveley et al. | ........... | 340/545.6 |
| 2010/0230500 A1* | 9/2010 | Wilkinson | .................. | 235/492 |

\* cited by examiner

*Primary Examiner* — Van T. Trieu
(74) *Attorney, Agent, or Firm* — Barbara R. Doutre

(57) ABSTRACT

A security tag contains two parts. The contact (or lack thereof) of the two parts defines the operational state of the security tag. In one state, the security tag responds when a central control station runs a wireless security scan. In the other state, the tag does not respond. Thus the wireless security scan reveals the tag's operational state. If, for example, one part of the tag is affixed to a window, and the other part affixed to a flame of the window, then the two parts can be arranged so that they are in contact when the window is closed but not in contact when the window is open. A wireless scan of the tag thus reveals whether or not the window is open. In one embodiment, one part of the security tag includes an RFID circuit, and the other part includes an antenna.

20 Claims, 2 Drawing Sheets

TWO-PART SECURITY TAG

FIELD OF THE INVENTION

The present invention is related generally to remote identification tags (e.g., RFID tags) and, more particularly, to security systems using such tags.

BACKGROUND OF THE INVENTION

There is a large market for security systems. In a typical system, security-monitoring sensors are installed throughout a residential or commercial location. These sensors are of various kinds, with some of them looking for unauthorized intrusions, smoke, spills, or other mishaps. When a sensor "triggers," that is, when the sensor notices something untoward, it usually alerts a central control station on the premises. The central control station may then raise an alarm to alert people on the premises. The central control station may also contact remote security personnel, depending upon the nature of the sensed disturbance. For example, when a smoke sensor triggers, the central control system may sound a local alarm and call the fire department (or call a security service that in turn calls the fire department).

These security systems are becoming more valuable as the types of sensors proliferate. While many of these sensors are relatively inexpensive, installation can be very expensive. Power and communications lines must be run to each wire-line sensor. When the configuration of the premises changes (more often an issue with commercial installations than with homes), the wire-line sensors must be repositioned and re-wired, and the whole system may need to be reconfigured so that the central control system understands the new layout. Wiring costs can be lowered by the use of sensors that run on batteries and that communicate wirelessly with the central control station. While the installation of these wireless sensors is cheaper than installing wire-line sensors, replacing batteries can be a burdensome chore, especially for a large commercial installation that may have hundreds of sensors.

BRIEF SUMMARY

The above considerations, and others, are addressed by the present invention, which can be understood by referring to the specification, drawings, and claims. According to aspects of the present invention, a chip-based security tag contains two parts. The contact (or lack thereof) of the two parts defines the operational state of the security tag. In one of the two states, the security tag responds when the central control station runs a wireless security scan. In the other state, the tag does not respond. Thus the wireless security scan reveals the tag's operational state. If, for example, one part of the tag is affixed to a window, and the other part affixed to a frame of the window, then the two parts can be arranged so that they are in contact when the window is closed but not in contact when the window is open. A wireless scan of the tag thus reveals whether or not the window is open. In some embodiments, the tag only responds to a wireless scan when its two parts are in contact; in other embodiments, the tag only responds when the two parts are not in contact.

In one embodiment, one part of the security tag includes an RFID circuit, and the other part includes an antenna. The RFID circuit is designed so that it only responds to a wireless scan when attached to the antenna.

The security tag's antenna can be manufactured using a thin film that is affixed to a window. If the window is broken, then the antenna breaks, which causes the security tag to enter a different operational state.

Several mechanisms are considered for joining the chip to its antenna. In addition to direct physical contact, a buckling spring, a magnetic sensor, or an electrically conductive intermediary can be used.

The security tag can be part of a normally open or a normally closed security switch.

BRIEF DESCRIPTION OF THE SEVERAL VIEWS OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

Figure 1:
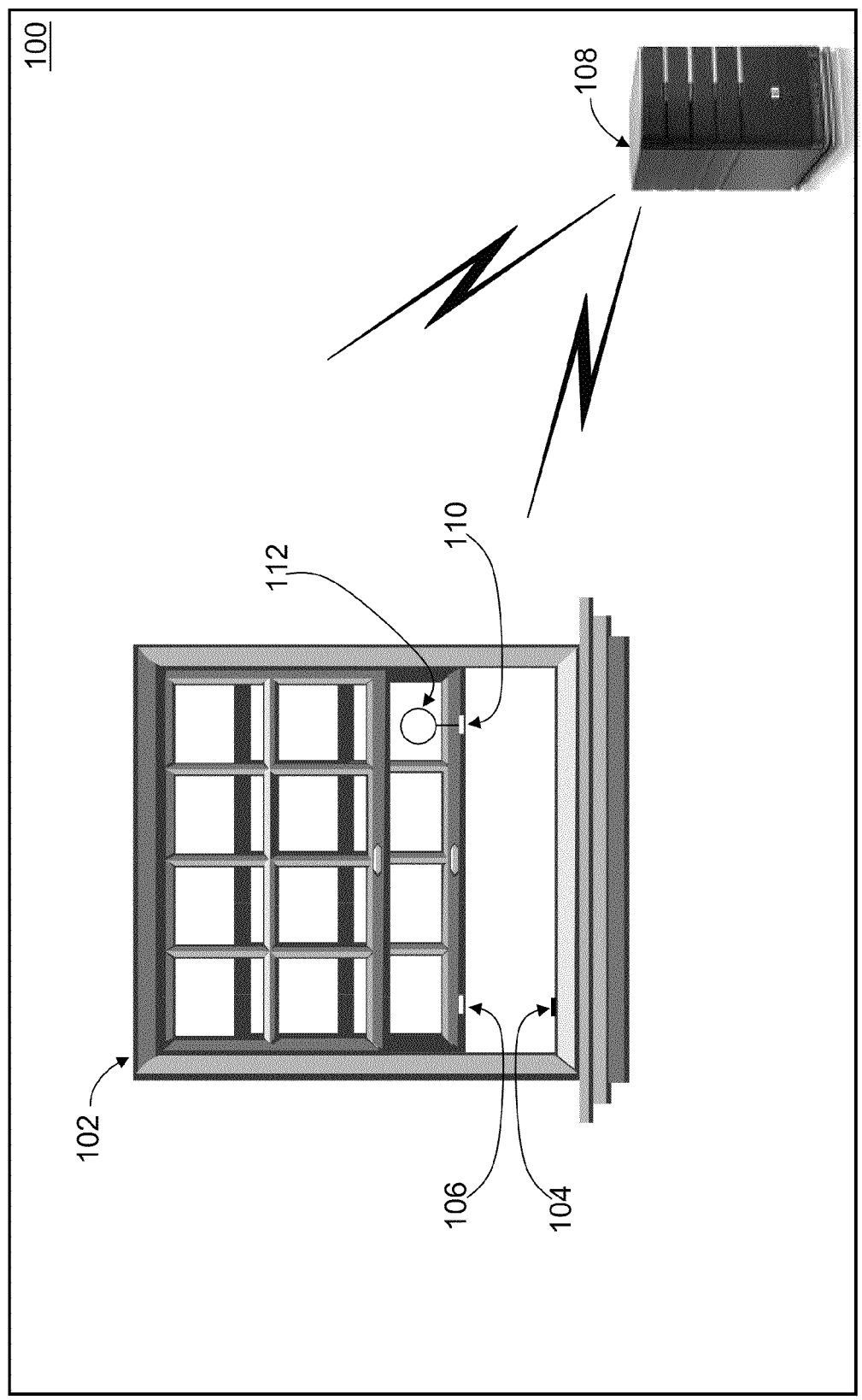
FIG. 1 is an overview of a representational environment in which the present invention may be practiced.

Turning to the drawings, wherein like reference numerals refer to like elements, the invention is illustrated as being implemented in a suitable environment. The following description is based on embodiments of the invention and should not be taken as limiting the invention with regard to alternative embodiments that are not explicitly described herein.

The security environment 100 of FIG. 1 could be a home, a business, or other installation. According to aspects of the present invention, a first part 104 of a two-part security tag 104 is attached (e.g., glued or bolted) to the frame of a window 102. Attached to the corresponding window sash is a second part 106 of the two-part security tag. When the window 102 is open as shown in FIG. 1, the two parts 104, 106 are not in contact with each other creating an open path between the first part (antenna) and the second part (circuit chip). However, when the window 102 is closed, the window sash comes down to the window frame, bringing the second part 106 into contact with the first part 104 of the security tag.

A central control station 108 periodically monitors the state of the two-part security tag 104, 106. In one embodiment, the security tag 104, 106 contains an RFID chip. In this case, the monitoring includes initiating a wireless security scan and listening for whatever RFID chips respond.

The security tag 104, 106 is so constructed that its response to the wireless security scan differs depending upon whether or not the two parts 104, 106 are in contact with one another. In some embodiments, the first part 104 includes an RFID chip, while the second part 106 includes an antenna. When the two parts 104, 106 are in contact (for example, when the window 102 is closed), they form a unified apparatus that responds to the wireless security scan. When the two parts 104, 106 are not in contact, the RFID chip in the first part 104 cannot use the antenna in the second part 106. The security tag 104, 106 then does not respond to the wireless security scan at all. Therefore, the central control station 108 knows the operational state of the two-part tag 104, 106, and, in consequence, knows whether the window 102 is open or closed. If an open window presents a security hazard, then the central control station 108 raises an alarm.

(In some cases the security tag 104, 106 actually does respond when the parts 104, 106 are not in contact. However, the response is so weak that either it cannot be heard by the central control station 108 at all, or the central control station 108 can clearly tell that the strength of the signal from the tag 104, 106 is different from the strength when the two parts 104, 106 are in contact. The result is the same: The central control station 108 reads the operational state of the two-part tag 104, 106, then, from that knowledge, it infers the state of the window 102 and takes appropriate action.)

Another aspect of the present invention is portrayed by the other two-part security tag 110, 112 shown on the window 102 in FIG. 1. Here, a first part 110 of the tag contains, for example, an RFID tag, while the second part 112 is an antenna. The antenna 112 is a very thin film resonant structure attached to a pane of the window 102. If this pane of the window 102 is broken, then the resonant characteristics of the antenna 112 change. Then the security tag 110, 112 would transmit its data at the new resonant frequency, which differs from the original frequency. In some embodiments, the central control station 108 is programmed to scan both the original and new frequencies to determine the status of the two-part security tag 110, 112. In an extreme example, the antenna 112 no longer operates, and the first part 110 of the two-part security tag operates just as does the first part 104 when separated from its second part 106: The two-part tag 110, 112 does not respond to a wireless security scan from the central control station 108. Even if the broken window pane leaves the antenna 112 partially intact, the change in the resonance of the antenna 112 changes the response of the two-part security tag 110, 112. The consequence is the same: During a wireless security scan, the central control station 108 reads the change in the state of the security tag 110, 112, infers that the pane of the window 102 has been broken, and takes appropriate action.

The previous discussion assumes that the central control station 108 knows the significance of a change in the operational state of a two-part tag 104, 106 (e.g., that the window 102 has gone from a closed state to an open one). The central control station 108 is programmed to know the significance of each two-part tag 104, 106, and knows how to respond accordingly. This kind of programming of the central control station 108 is well known from the art of wired security systems.

The two-part security tags 104, 106 of the present invention do impose at least one constraint on the central control station 108 that is not present for wired security switches. The range of a wireless scan is limited, so the system must be designed to allow reliable RF communications between the central control station 108 and all of the tags 104, 106 that it is responsible for.

The two-part security tags 104, 106 of the present invention can be embodied as replacements for (or used in conjunction with) well known, wired security switches (normally open and normally closed) and can be used wherever those switches are currently used. For example, two-part security tags 104, 106 can be affixed to doors as well as windows and to other breakable surfaces. The tags 104, 106 can be used anywhere the movement of two surfaces relative to one another might be a reason for concern. For another example, one part 104 could be affixed to a control body (e.g., a valve body), and the other part 106 to a movable control (e.g., a valve-control wheel). Then the central control station 108 will know the status of the control. In other embodiments, a two-part security tag 104, 106 can be attached to one or more of the sensors known in the art (for, e.g., temperature, smoke, dust, liquid level, etc.) and send the output of that sensor. Many other applications of security switches are known from the art.

Figure 2:
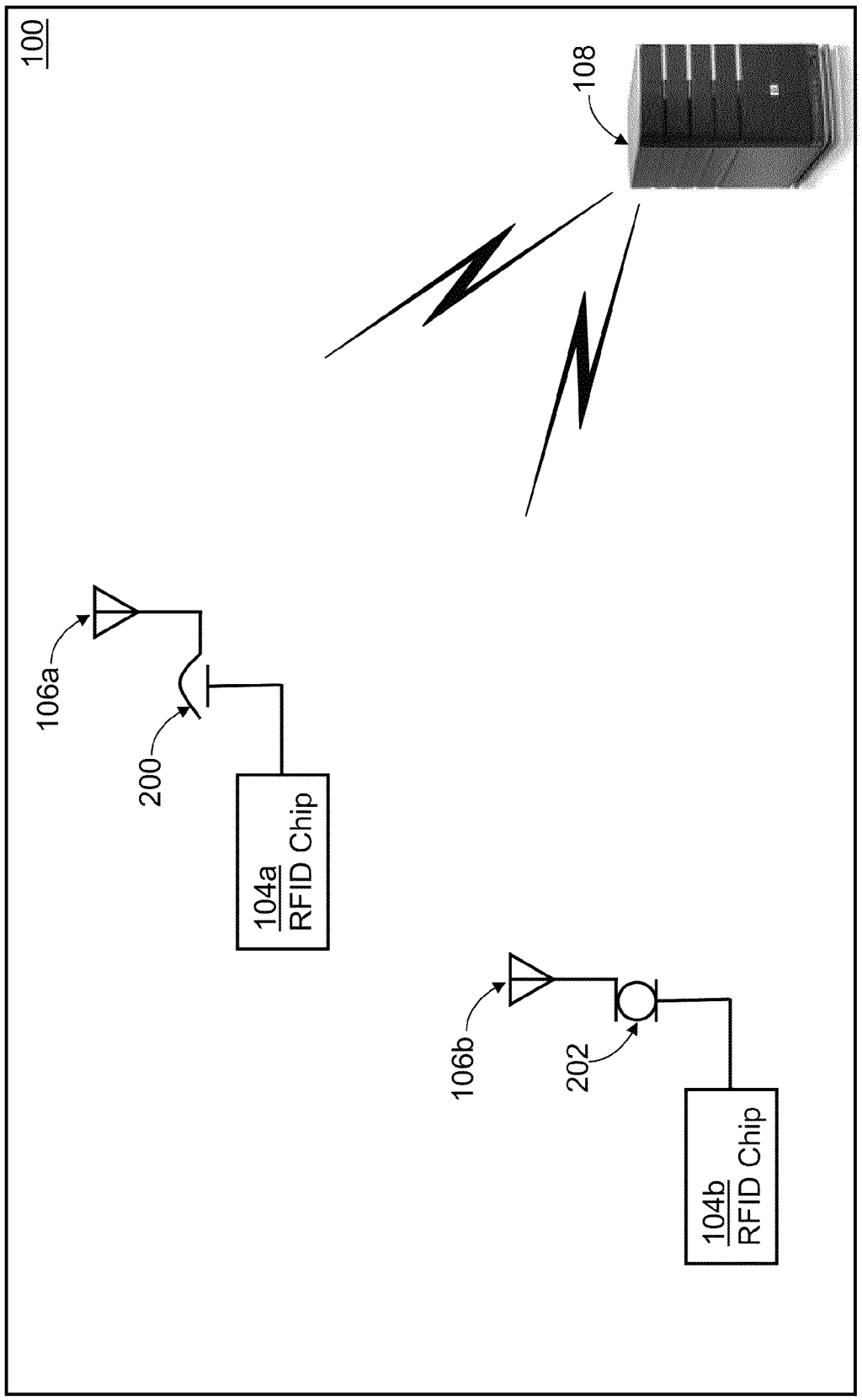
FIG. 2 is a schematic of two exemplary ways to connect the two parts of the security tag.

FIG. 2 presents two examples of how the two parts 104, 106 of a security switch can make contact with one another. (Of course, simple physical contact between the two parts 104, 106 works in many applications.) The two-part switch 104a, 106a at the top of FIG. 2 includes a "buckling spring" between the two parts 104a, 106a. When the two parts 104a, 106a are brought close enough together, the buckling spring 200 buckles to form a positive electrical contact between the chip 104a and the antenna 106a.

In the other two-part tag of FIG. 2, an electrically conductive intermediary substance 202 joins the two parts 104b, 106b. The intermediary substance 202 can be, for example, a conductive silicon weather-stripping material. The physical "give" of this substance 202 allows a good electrical contact even when the alignment of the two parts 104b, 106b is not precise and makes this an ideal embodiment for use on the window 102 of FIG. 1.

Embodiments of the present invention provide all of the advantages of the currently available wired security switches but avoid the expense of providing the wiring. Also, for embodiments in which the security tag is passive, the security tags eliminate the need for changing (and periodically checking) batteries in the currently available active wireless security switches. Thus, the present invention greatly reduces the costs of securing an installation while providing no disadvantages as compared with known devices.

In view of the many possible embodiments to which the principles of the present invention may be applied, it should be recognized that the embodiments described herein with respect to the drawing figures are meant to be illustrative only and should not be taken as limiting the scope of the invention. For example, the physical configuration of the two-party security tag can be changed to suit a particular environment (e.g., the housing may need to be waterproof) or a particular application. Therefore, the invention as described herein contemplates all such embodiments as may come within the scope of the following claims and equivalents thereof.

I claim:

1. A security tag comprising:
a first part and a second part operatively connectable to, and separable from, one another;
wherein the security tag is configured to have two operational states, a first operational state when the first and second parts are operatively connected together and a second operational state when the first and second parts are not operatively connected together; and
wherein the security tag is configured to respond to a wireless scan when in one of the two operational states and is configured to not respond to a wireless scan when in the other operational state, even though RF is presented to the security tag.

2. The security tag of claim 1:
wherein the first part comprises an antenna; and
wherein the second part comprises an RFID circuit.

3. The security tag of claim 1 wherein the first and second parts are operatively connectable together via an element selected from the group consisting of: a buckling spring, direct physical contact, and an electrically conductive intermediary.

4. The security tag of claim 1 wherein the first and second parts each comprise an adhesive.

5. The security tag of claim 1 wherein the security tag is configured to respond to a wireless scan when the first and second parts are operatively connected together.

6. The security tag of claim 1:
wherein the first part is affixed to a movable structure of a building;
wherein the second part is affixed to a non-movable structure of a building;

wherein when the movable structure is closed, the first and second parts are operatively connected together; and wherein when the movable structure is not closed, the first and second parts are not operatively connected together.

7. The security tag of claim 6 wherein the movable structure is selected from the group consisting of: a window and a door.

8. The security tag of claim 6 wherein the non-movable structure is selected from the group consisting of: a window frame and a door frame.

9. A security tag comprising:
   a thin-film antenna and an RFID circuit operatively connected together providing a two-part security tag;
   wherein the security tag is configured to have two operational states, a first operational state when the antenna is unbroken and a second operational state when the antenna is broken, the antenna operating at an original resonant frequency when unbroken and a different resonant frequency when broken; and
   wherein the security tag is configured to respond to a wireless scan when in one of the two operational states and is configured to not respond to a wireless scan when in the other operational state.

10. The security tag of claim 9 wherein the security tag is configured to respond to a wireless scan when the antenna is unbroken.

11. The security tag of claim 9 wherein the security tag is configured to respond to a wireless scan when the antenna is broken.

12. The security tag of claim 11 wherein a resonance of the antenna prevents the security tag from responding to a wireless scan when the antenna is unbroken.

13. The security tag of claim 9 wherein the thin-film antenna is affixed to a window pane.

14. The security tag of claim 9, wherein a central control station is programmed to wirelessly scan both the original and new frequencies to determine the status of the two-part security tag.

15. The security tag of claim 9, wherein the two-part tag does not respond to the wireless scan when the antenna is broken.

16. A security switch comprising:
   a first part and a second part operatively connectable to, and separable from, one another; and
   a security tag comprising a third part and a fourth part operatively connectable to, and separable from, one another;
   wherein the first part of the security switch comprises the third part of the security tag;
   wherein the second part of the security switch comprises the fourth part of the security tag;
   wherein the third and fourth parts of the security tag are operatively connected together when, and only when, the first and second parts of the security switch are operatively connected together;
   wherein the security tag is configured to have two operational states, a first operational state when the third and fourth parts are operatively connected together and operating at a first frequency and a second operational state when the third and fourth parts are not operatively connected together and operating at a second frequency different from the first frequency; and
   wherein the security tag is configured to respond to a wireless scan using the first frequency when in one of the two operational states and is configured to not respond to a wireless scan when in the other operational state and operating at the second frequency.

17. The security switch of claim 16 wherein the security switch is selected from the group consisting of: a normally open security switch and a normally closed security switch.

18. The security switch of claim 16 wherein the first and second parts are operatively connectable together via a magnet.

19. The security switch of claim 16 wherein the security tag is configured to respond to a wireless scan when the third and fourth parts are operatively connected together.

20. The security switch of claim 16 wherein the security tag is configured to respond to a wireless scan when the third and fourth parts are not operatively connected together.

* * * * *